April 16, 1940. E. M. WRIGHT ET AL 2,197,285
HACKSAW FRAME
Filed July 14, 1937
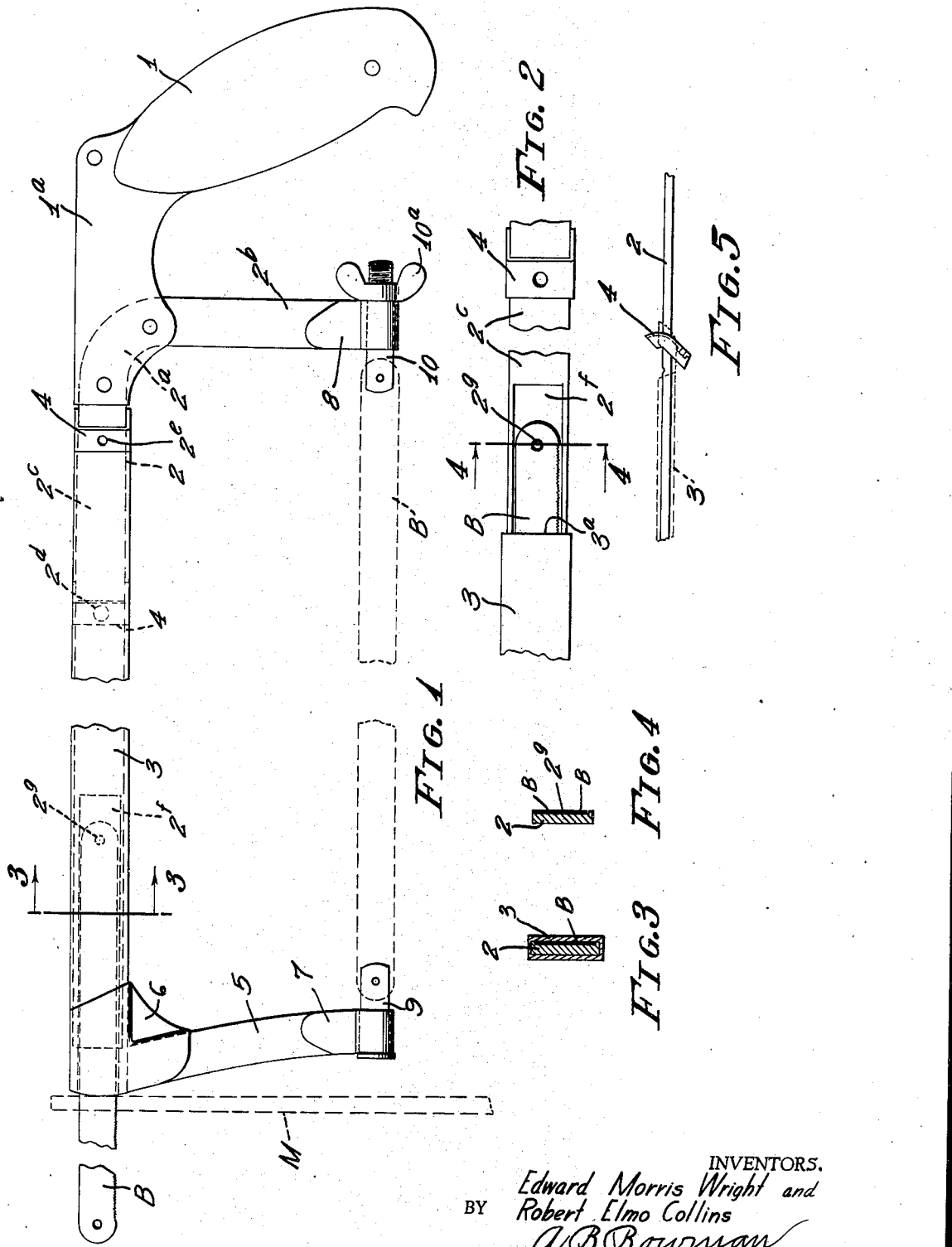
INVENTORS.
Edward Morris Wright and
BY Robert Elmo Collins
A.B.Bowman
ATTORNEY.

UNITED STATES PATENT OFFICE 2,197,285

HACKSAW FRAME

Edward Morris Wright, La Mesa, and Robert Elmo Collins, San Diego, Calif.; said Collins assignor to George M. Roudabush, La Mesa, Calif.

Application July 14, 1937, Serial No. 153,540

2 Claims. (Cl. 145—33)

Our invention relates to a frame for hacksaws or other light saw frames such as meat saws or the like and surgical saws, and the objects of our invention are:

First, to provide a saw frame of this class in the form of a hacksaw frame in which the blade may be supported in substantially the conventional form, or the same blade may be used in connection with the frame so that it extends forwardly of the frame and is shiftably mounted in the frame so that the blade may enter a small opening if desired and a saw cut be made.

Second, to provide a saw frame of this class in which the saw blade when used in the extended form is supported and guided by the frame and will saw a strip as wide as desired.

Third, to provide a hacksaw frame of this class which is adjustable for varying length blades in the conventional form;

Fourth, to provide a saw frame of this class in which the blade may be quickly transferred for use in the conventional form to use in the extended form;

Fifth, to provide a saw frame of this class in which the two supports for the blade in varying positions add very little or no additional expense to the conventional form of saw frame;

Sixth, to provide a saw frame of this class in which the frame is reinforced and strong throughout; and Seventh, to provide a saw frame of this class which is very simple and economical of construction, efficient in its action, durable, and which will not readily deteriorate or get out of order.

With these and other objects in view as will appear hereinafter, our invention consists of such novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a fragmentary side elevational view of our saw frame showing the blade in raised position in the extended manner by solid and dash lines and showing the blade positioned in the conventional form by dash lines; Fig. 2 is a fragmentary enlarged side elevational view showing the frame in position for securing the blade in the extended position as shown by dash lines in Fig. 1 of the drawing; Fig. 3 is a transverse sectional view from the line 3—3 of Fig. 1; Fig. 4 is a transverse sectional view from the line 4—4 of Fig. 2; and Fig. 5 is a top edge view of a fragmentary portion of the frame showing the adjustment clip for adjusting the frame for varying length saw blades when used in the conventional manner and showing by dash lines the abutting position of the adjustment member of the frame member 3.

Similar characters of reference refer to similar parts and portions throughout the several views of the drawing.

The handle member 1, stationary shank member 2, shiftable shank member 3, length adjustment member 4, saw blade supporting shank 5, reinforcing member 6, loop members 7 and 8, and saw blade supporting lugs 9 and 10 constitute the principal parts and portions of our hacksaw frame.

The handle member 1 is a hollow grip like member adapted to fit the four fingers of the hand and is provided with a forwardly extending slotted portion 1a shown in Fig. 1 of the drawing. Secured in the lower forward end in the slot for receiving the same is the curved portion of the stationary shank member 2, the curved portion being designated 2a; and it is secured in said slot by spot welding, but may be secured by other means if desired. This provides a downwardly extending shank portion 2b and a forwardly extending shank portion 2c.

Secured on the lower extended end of the shank portion 2b is a loop member 8, preferably secured by spot welding. This loop member is provided with an opening which is adapted to receive the lug bolt 10 which supports the one end of the saw blade B shown by dash lines in Fig. 1 of the drawing, and this lug bolt is provided with a wing nut 10a thereon for tightening the saw blade B in position in the conventional manner.

The shank portion 2c is provided with two spaced holes 2d and 2e which are adapted to receive a lug extending inwardly from one side of the length adjusting member 4 shown best in Fig. 5 of the drawing so that this member 4 may be located as shown by solid lines in Fig. 5 of the drawing and then shifted along the shank member 2c to the dotted line position, shown in Fig. 1 of the drawing, and positioned so that the main portion is in alignment with the shank portion 2c and serves as a stop and support for adjusting the frame for varying length blades when used in the conventional manner as shown by dash lines in Fig. 1 of the drawing. The extended end of the stationary shank member 2c is rectangular in shape and provided with a slot 2f in its extended end which is of the proper width and depth to receive the one end of the saw blade B as shown best in Fig. 2 of the drawing.

Positioned in this slot 2f is a round lug member 2g which is adapted to enter the holes in the one end of the saw blade B as shown best in Fig. 2 in the drawing for securing the saw blade relatively to the shank 2.

Shiftable reciprocally over the stationary shank member 2 at its extended end in a telescopic manner is the shiftable shank member 3 which is provided with a rectangular in cross section opening longitudinally its full length. However, it is provided with one side closed at its extended end leaving an open space of sufficient width and depth to permit the reciprocation of the saw blade B therethrough, so that the saw blade B may be extended as shown by dash line in Fig. 1 of the drawing. The one end of this member 3 at 3a is adapted to engage the stop member 4 positioned in either position on the stationary member 2.

Secured to the forward member of the shiftable shank member 3 and extending downwardly and backwardly in slightly curved form is a saw blade supporting shank 5 which is secured to the extended end of the member 3 by means of a reinforcing member 6 which extends around the end of the member 3 and over the upper end of the member 5 and forms a reinforcement at the joint and is preferably spot welded thereto, thus securing a rigid reinforced relation between the members 3 and 5, all as shown best in Fig. 1 of the drawing.

Secured on the lower extended end of the member 5 is a loop member 7 which is similar to the loop member 8 and is preferably secured to said member 5 by spot welding, but may be secured in other manner as desired. It is provided with a hole therethrough in which is mounted a lug member 9 which is adapted to support the one end of the saw blade B as shown by dash lines in Fig. 1 of the drawing.

The device described above may be regarded as comprising two complementary relatively movable frame means or frame sections that together constitute a hacksaw frame, one of the frame means or sections including the shank 2, the rearward blade supporting arm 2b and the handle 1, the other frame means or section including the shiftable shank member 3, and the forward blade supporting arm 5.

The operation of our hacksaw frame is as follows: When the saw is to be used in the conventional manner, the blade B is secured on the lug member 9 and positioned on the lug member 10; then the wing nut is tightened turning the blade in the conventional manner and the saw is used thus in the conventional manner by grasping the handle 1 and reciprocating the saw blade in the material to be sawed. When it is desired to use the saw blade in the extended form for sawing in holes or small places, or sawing great width, the blade B is removed by loosening the wing nut 10a and the blade B is then inserted in the slot 2f in the member 2 at its one end, the hole in said blade being positioned over the lug 2g with the saw teeth facing downwardly; then the extended end of the blade and the extended end of the shank member 2 are positioned in the end 3a of the shiftable shank member 3, the saw blade extending out through the opening in the end of the member 3 as shown best in Fig. 1 of the drawing, past the end of the shank member 3; then by placing these reinforcing portions 6 at the upper end of the shank member 5, the material to be sawed shown by M in Fig. 1 of the drawing by dash lines, the handle is then reciprocated with the member 6 and the upper end of the member 5 against the material end and the extended end of the saw blade B will cut into the material M, the member 4 forming the stop for the forward reciprocation of the blade.

It will be noted that this member 4 also engages the end of the member 3 for holding the member 3 relatively to the member 2 in a telescopic relation for tightening the blade B when in the conventional form as shown by dash lines in Fig. 1 of the drawing.

Though we have shown and described a particular construction, combination, and arrangement of parts and portions, we do not wish to be limited to this particular construction, combination, and arrangement, but desire to include in the scope of our invention, the construction, combination and arrangement substantially as set forth in the appended claims.

Having thus described our invention, what we claim as new and desire to secure by Letters Patent is:

1. An extensible U-shaped hacksaw frame comprising, forward and rearward frame sections each including legs for supporting a saw blade in normal position and complementary telescoping and slidably engageable shanks forming the back of the frame, and means on the shank of said rearward section for receiving an end of a blade projecting outwardly beyond said forward section, the shank of said forward section being hollow to slidably embrace the blade projecting therethrough to guide the same.

2. An extensible U-shaped hacksaw frame comprising forward and rearward frame sections each including legs for supporting a saw blade in normal position and complementary telescoping and slidably engageable shanks forming the back of the frame, and means including opposed blade engaging shoulders provided on the shank of said rearward section for receiving an end of a blade projecting outwardly beyond said forward section, the shank of said forward section being hollow to slidably embrace the blade projecting therethrough to guide the same.

EDWARD MORRIS WRIGHT.
ROBERT ELMO COLLINS.